(12) United States Patent
Meyer

(10) Patent No.: US 6,881,370 B2
(45) Date of Patent: Apr. 19, 2005

(54) METHOD FOR FABRICATING A HARD COVER FOR AN ARTICLE

(76) Inventor: Karl R. Meyer, 14217 N. 54th St., Scottsdale, AZ (US) 85254

( * ) Notice: Subject to any disclaimer, the term of this patent is extended or adjusted under 35 U.S.C. 154(b) by 142 days.

(21) Appl. No.: 10/090,665

(22) Filed: Mar. 5, 2002

(65) Prior Publication Data

US 2003/0168774 A1 Sep. 11, 2003

(51) Int. Cl.[7] .............................................. B29C 33/38
(52) U.S. Cl. ...................... 264/225; 264/220; 264/338; 264/342 R
(58) Field of Search ................................ 264/225, 220, 264/257, 338, 342 R

(56) References Cited

U.S. PATENT DOCUMENTS

| 3,602,759 A | 8/1971 | Evans |
| 3,770,546 A | 11/1973 | Childress et al. |
| 4,155,970 A | 5/1979 | Cassell |
| 4,781,870 A | 11/1988 | Talbert |
| 5,491,017 A | 2/1996 | Todt |
| 5,628,812 A | 5/1997 | Tempe |

*Primary Examiner*—Allan R. Kuhns
(74) *Attorney, Agent, or Firm*—Snell & Wilmer, L.L.P.

(57) ABSTRACT

A method for facilitating the fabrication of a hard cover for an article is provided. The method includes positioning shrinkable material over at least a portion of the article and shrinking the shrinkable material to form a fitted cover for the portion of the article. A layer of molding material is applied overlying the fitted cover to form a hard cover for the portion of the article. A method for facilitating fabrication of a first article from a second article is also provide. The method includes positioning shrinkable material over at least a portion of the second article and shrinking the shrinkable material to form a fitted cover for the portion of the second article. A first layer of molding material is applied overlying the fitted cover to form a mold. The mold has a surface which is a negative impression of at least a portion of the fitted cover. The mold is removed from the fitted cover and a second layer of molding material is applied overlying the surface of the mold to form the first article.

8 Claims, 4 Drawing Sheets

METHOD FOR FABRICATING A HARD COVER FOR AN ARTICLE

FIELD OF THE INVENTION

The present invention relates generally to a molding process and more particularly to a method for fabricating a hard cover for an article.

BACKGROUND OF THE INVENTION

Covers for articles such as boats, jet skis and other watercraft, cars, electronic devices, avionics, navigation devices and controls, and other products that are exposed to the elements, including sun, rain, snow, hail, dust and wind, typically include covers made from flexible materials such as canvas. Depending on the materials from which they are made, the covers may have relatively short life-spans due to wearing from exposure to the weather and from repeated use. In addition, covers made from flexible materials generally are not manufactured to fit a particular article but, rather, are manufactured as tarps that lie over an article and tie beneath the article or at an edge of the article. As in the case of cars, boats, other watercraft and the like, during travel the covers may flap, rip or otherwise separate from the covered article. Further, such covers are generally not adequately secure and are susceptible to lacerations, rips and tears due to knives, tree branches, and other sharp objects. As in the case of boats, cars, jet skis, and the like, where valuables may be stored, covers made from flexible materials typically are not sufficiently capable of providing protection for such valuables.

Attempts have been made to manufacture hard covers that are capable of withstanding environmental elements and typical physical wear and use. However, manufacturing such hard covers has proven challenging. Attempts to form hard covers while using the original article in the process may destroy or damage the original article. Fabricating molds of the original article from which to manufacture the hard cover also may damage or destroy the original article and/or may be excessively expensive due to the skill required to make the molds. Further, hard covers that are made to custom fit an article may be too difficult to adequately produce in a timely, cost-efficient manner.

Accordingly, a need exists for a better method of fabricating a hard cover for at least a portion of an article. A need further exists for a better method of fabricating, in a cost-efficient manner, a hard cover for at least a portion of an article.

SUMMARY OF THE DISCLOSURE

This summary of the invention section is intended to introduce the reader to aspects of the invention and is not a complete description of the invention. Particular aspects of the invention are pointed out in other sections herein below, and the invention is set forth in the appended claims which alone demarcate its scope.

In accordance with an exemplary embodiment of the present invention, a method for facilitating fabrication of a hard cover for an article is provided. The method includes positioning shrinkable material over at least a portion of the article and shrinking the shrinkable material to form a fitted cover for the portion of the article. A layer of molding material is applied overlying the fitted cover to form a hard cover for the portion of the article.

In accordance with another exemplary embodiment of the present invention, a method for facilitating fabrication of a first article from a second article is provided. The method includes positioning shrinkable material over at least a portion of the second article and shrinking the shrinkable material to form a fitted cover for the portion of the second article. A first layer of molding material is applied overlying the fitted cover to form a mold. The mold has a surface which is a negative impression of at least a portion of the fitted cover. The mold is removed from the fitted cover and a second layer of molding material is applied overlying the surface of the mold to form the first article.

In accordance with a further exemplary embodiment of the present invention, a method for facilitating fabrication of a first article from a second article is provided. The method includes forming over at least a portion of the second article a cover of a heat shrinkable material. The cover is heated to shrink the heat shrinkable material to form a fitted cover for the portion of the second article. A first wax layer is applied overlying a surface of the fitted cover and a first protective layer is applied overlying the first wax layer. A first layer of surface coating is applied overlying the first protective layer. A first layer of molding material then is applied overlying the first layer of surface coating to form a mold having a surface which is a negative impression of at least a portion of the fitted cover. The mold is removed from the fitted cover and a second wax layer is applied to the surface of the mold. A second protective layer is applied overlying the second wax layer and a second layer of surface coating is applied overlying the second protective layer. A second layer of molding material is applied overlying the second layer of surface coating to form a first article. The first article is then removed from the mold.

In accordance with yet another embodiment of the invention, a method for fabricating a mold from an article is provided. The method includes applying shrinkable material over at least a portion of the article and shrinking the shrinkable material to form a fitted cover for the portion of the article. A layer of molding material is applied overlying the fitted cover to form a mold for the portion of the article.

These and other aspects of the present invention are described in the following description, attached drawings and claims.

BRIEF DESCRIPTION OF THE DRAWINGS

A detailed description of embodiments of the invention will be made with reference to the accompanying drawings, wherein like numerals designate corresponding parts in the several figures, and wherein.

DETAILED DESCRIPTION OF THE INVENTION

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

A method for fabricating a cover for an article in accordance with an exemplary embodiment of the present invention is herein provided. The article may include any device, vehicle, tool or other object for which a protective, custom-fit, hard cover is desired. Typical suitable applications for the method of the present invention may include covers for automobiles, boats, jet skis and other water and snow vehicles that are generally exposed to the elements when stored. Other suitable applications include covers for devices having sharp objects, such as cutting tools, which are inclined to cut, tear or rip soft or cloth covers. The method of the present invention may also be used to fabricate covers for portions of land, air and/or water vehicles, such as, for example, covers for aircraft cockpits, convertible automobile covers, and boat navigation console covers. The hard cover fabricated from the method of the present invention is capable of withstanding wear and tear from environmental conditions, such as rain, snow, wind, sand, heat and ultraviolet radiation. In addition, while the hard cover formed by the method of the present invention may have some flexibility, in an exemplary embodiment, the hard cover may be fabricated to withstand strong impacts and blunt forces. The hard cover may also be fabricated to be securely anchored to the article for which it is manufactured. In this manner, risk of theft of the hard cover may be reduced. In addition, in the cases where the hard cover is used to cover the interior of vehicles, securing the hard cover to the vehicle may reduce or eliminate the risk of theft of items in the interior of the vehicle. The method of the present invention also may be used to fabricate custom-fit parts for articles, such as, for example, bumpers of automobiles.

Figure 1:
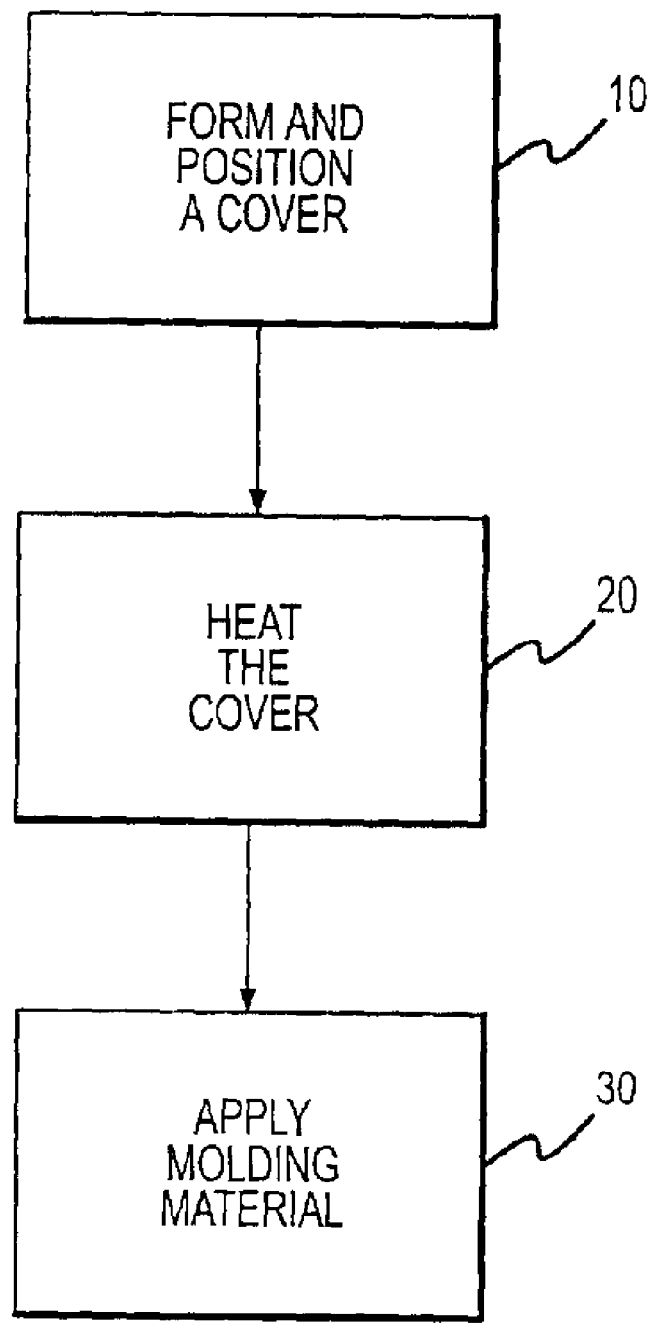
FIG. 1 illustrates a method for forming a hard cover for at least a portion of an article in accordance with an exemplary embodiment of the present invention.

FIG. 1 illustrates a method for fabricating a hard cover for an article in accordance with an exemplary embodiment of the present invention. The method includes forming a cover from a heat shrinkable material, the cover formed for an article or, alternatively, for a portion of an article, for which a hard cover is to be fabricated and positioning the cover over the article. (Step 10). In an exemplary embodiment of the invention, the shrinkable material is heat shrinkable material, although the shrinkable material may include any material that can be shrunk, such as by water, ultraviolet light, etc., over an object. Heat shrinkable material is typically a polymer material, or a combination of layers of polymer materials that is configured to shrink when subjected to heat above a certain temperature. In an exemplary embodiment, the heat shrinkable material is a high strength shrink wrap material product that provides an interior surface or lining that protects the article from abrasion. An example of such a material suitable for use in the present invention is Transhield™ by Transhield, Inc., Elkhart, Ind. It will be appreciated, however, that any suitable shrink wrap material may be used. The cover is formed by patterning and cutting the shrink wrap material into pieces. The shrink wrap material may be cut by standard scissors, a cutting knife, or any other suitable cutting device. The pieces of shrink wrap material then are attached together to form a loose, custom fit cover for the article. Typically, the pieces may be sewn together. Alternatively, the pieces may be attached by a suitable adhesive, by taping, or by any other suitable mechanism for attaching the pieces. In an exemplary embodiment, the seams formed by attachment of the pieces are substantially flat so that a subsequently-applied moldable material, as described in more detail below, does not incorporate or mirror any blemish or pucker in the seams. By patterning and sewing together pieces of shrink wrap material, a cover that custom fits the features of the article may be fabricated. For example, if the article is a watercraft, the cover can be fabricated to cover the bow, windshield and hull while providing pockets that are configured to receive and envelope the side mirrors.

While the cover may be fabricated so that when it is shrunk to the article, as described in more detail below, it conforms to the contours of the article itself, the article surface may be modified, such as by padding the article with padding materials or "tenting" features of the article, to alter the contours of the article before the cover is positioned over the article. For example, in one embodiment by padding edges of the article, the contours of the article can be rounded resulting in more rounded contours of the interior surface of the resulting hard cover. In another embodiment, by "tenting" features, that is, by forming a tent of a material over a feature of an article, the subsequently fabricated hard cover can be formed so that interior surfaces of the hard cover do not contact various surfaces of the article where such contact may be undesirable. Once the cover is suitably formed and, optionally, the article suitably prepared, the cover is positioned over the article (or portion of the article).

The shrinkable material is then shrunk to the article. (Step 20). In an exemplary embodiment, when the cover is made from heat shrinkable material, heat is applied to the cover to shrink the cover to the article. The heat may be applied by use of a heat gun, heat lamps, heating chamber, or other suitable heating mechanism. The heat applied should be of a temperature suitable for shrinking the shrink wrap material to the article. Typically, heat is applied at temperatures in the range of approximately 210–235° F., although it will be appreciated that the temperature of the heat applied will suitably depend on the composition of the shrink wrap material used to fabricated the cover. In an exemplary embodiment, heat is applied to the shrink wrap material so that the shrink wrap material shrinks to form a taut, fitted cover over the article. Optionally, a molding clay may be applied to the seams of the fitted cover to even the surface of the cover.

Once the fitted cover is formed and has cooled to a desired temperature, a layer of molding material may be applied to the fitted cover (Step 30). The molding material may comprise any suitably monomer, polymer or other material or combination of materials that forms a hard cover on the fitted cover. Typically, the molding material is applied to the fitted cover in a liquid or paste phase and is then permitted to set up or otherwise is cured or hardened by heat or other physical or chemical mechanism so that that molding material forms a hard cover. In an exemplary embodiment, the molding material is applied so that the resulting hard cover has a thickness sufficient to protect the article or portion of the article from theft and environmental elements and to withstand impacts from falling debris such as rocks, tree branches, hail and the like. In another exemplary embodiment, the hard cover may be approximately $\frac{1}{8}$–$\frac{1}{4}$ inches thick. However, it will be appreciated that the hard cover may have any suitable thickness that will ensure the strength of the hard cover and will prevent damaging flexing or twisting of the cover.

In an exemplary embodiment of the invention, the molding material comprises fiberglass that is combined with a suitable resin to form a molding mixture that can be applied at room temperature, as is well known in the molding industry. The fiberglass/resin mixture may be applied to the fitted cover by any mechanism as is well known. For example, the fiberglass may be applied in sheets, strips and/or small pieces and the resin may be painted or wiped over the fiberglass. This process may be continued until a layer of molding material having a desirable thickness is achieved. Optionally, the fiberglass may be applied as fibers by a fiberglass gun applicator that sprays the fiberglass fibers and resin together over the fitted cover. Alternatively, the fiberglass and resin may be applied by any other suitable method that achieves a layer of molding material having a thickness and surface texture of relative consistency.

In one exemplary embodiment of the invention, the layer of molding material may be treated to compact the layer and to release any air pockets or bubbles that may have formed in the layer. Such treatment may include, for example, rolling the layer with a roller or other suitable device.

In another exemplary embodiment of the invention, any excess and undesired molding material may be removed with a sharp object, such as a knife, after the molding material has set but before the molding material has hardened. If the layer of molding material is trimmed before it has had an opportunity to set, it may rip or tear when trimmed. If the layer of molding material is trimmed after it has hardened, it may be too hard to trim, even with a sharp object, thus requiring labor intensive, and dirty, power cutting tools.

Once the molding material has hardened to form a hard cover, the hard cover is removed from the fitted cover for further finishing or for use.

Figure 2:
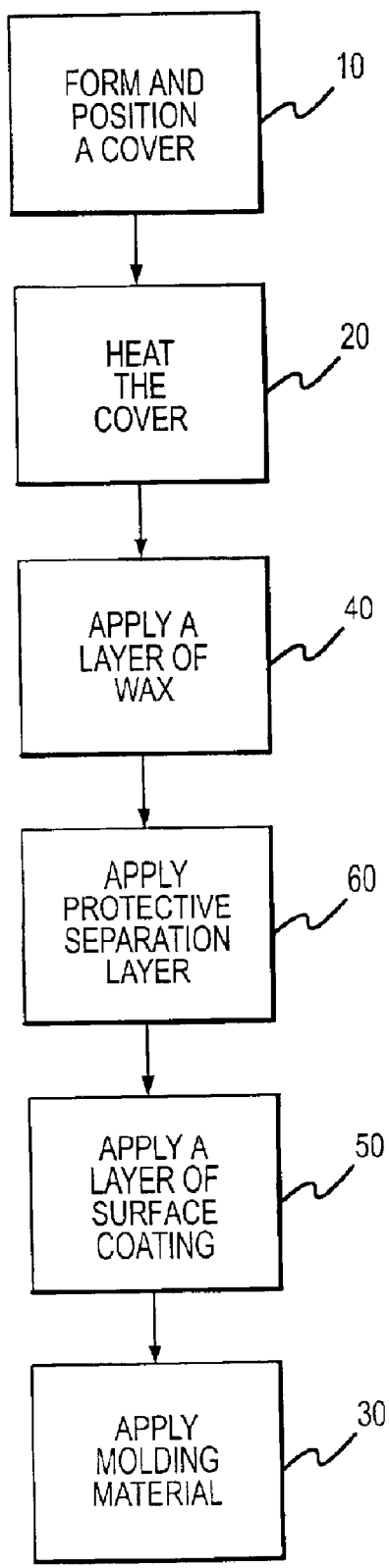
FIG. 2 illustrates a method for forming a hard cover for at least a portion of an article in accordance with another exemplary embodiment of the present invention.

FIG. 2 illustrates another exemplary embodiment of the present invention. In this embodiment, a fitted cover is formed using the same processes as described above with reference to steps 10 and 20 of FIG. 1. After the fitted cover is formed and has cooled, the fitted cover is then coated with a layer of wax which will permit the subsequently-formed hard cover to be easily removed from the fitted cover without sticking (Step 40). In an exemplary embodiment, the wax comprises a mold release wax. Mold release waxes are well known in the molding industry. An example of a mold release wax suitable for use in the present invention is TR-216 by AOC Hawk Ltd., Essex, United Kingdom. It will be appreciated, however, that any suitable wax which, when applied with a suitable thickness, will permit the hard cover to be easily removed from the fitted cover and which will not react adversely with the other components used to form the hard cover may be used. The wax may be applied to the fitted cover by manual application, such as by applying with a cloth, brush, or other applicator, or may be sprayed on the fitted cover by an atomizer or other spray applicator.

In another embodiment of the invention, a layer of surface coating may be applied overlying the fitted cover, preferably overlying the layer of wax, before the molding material is applied. (Step 50). As used herein, the term "surface coating" refers to any coating, either colored or clear, providing a cosmetic enhancement and/or protection for the molding material. For example, the surface coating may include a gel coating, a tooling gel coating, a sanding primer and the like. It will be appreciated, however, that any suitable surface coating may be used in the present invention. The surface coating may be applied to the fitted cover over portions of the article for which the hard cover is to be formed. For example, if the article is a boat and a hard cover that covers only a portion of the boat is to be formed, the surface coating may be applied to only those portions of the boat for which a hard cover is desired. The surface coating may be applied manually, such as with the use of a brush or other applicator, or may be sprayed over the fitted cover by an atomizer or may be applied by any other suitable method that achieves a surface coating layer having a relatively consistent thickness and surface texture. In one exemplary embodiment, the surface coating is applied such that it has a thickness of approximately 15–25 mils. In a preferred embodiment, the surface coating is applied so that it has a thickness of 18–22 mils, although it will be appreciated that the surface coating may be applied so that it has any thickness suitable for a desired application. After the surface coating is applied, it is permitted to set until it becomes tacky to the touch, at which time the molding material may be applied to the surface coating (Step 30).

In an optional embodiment of the invention, a protective layer may be applied overlying the fitted cover, preferably overlying the layer of wax (Step 60), before the layer of surface coating and/or the layer of molding material is applied. In an exemplary embodiment, the protective layer is formed of suitable components and has a sufficient thickness so that it serves to protect the fitted cover from subsequently-applied components and processing steps used to form the hard cover, such as the molding material and/or surface coating, which may chemically or physically damage the integrity of the fitted cover. The protective layer may also facilitate removal of the subsequently-formed hard cover from the fitted cover. In a preferred embodiment of the present invention, the protective layer comprises polyvinyl alcohol (PVA). PVA is a water-based compound that can be easily removed from the hard cover and/or the fitted cover by washing with water. The PVA may be applied in any suitable manner but typically is sprayed onto the fitted cover by an atomizer or spray gun. In an exemplary embodiment, the PVA is sprayed onto the fitted cover in multiple stages or films so that the desired thickness of the layer is achieved. In one exemplary embodiment, approximately 4 to 6 layers of the PVA is sprayed overlying the fitted cover.

Figure 3:
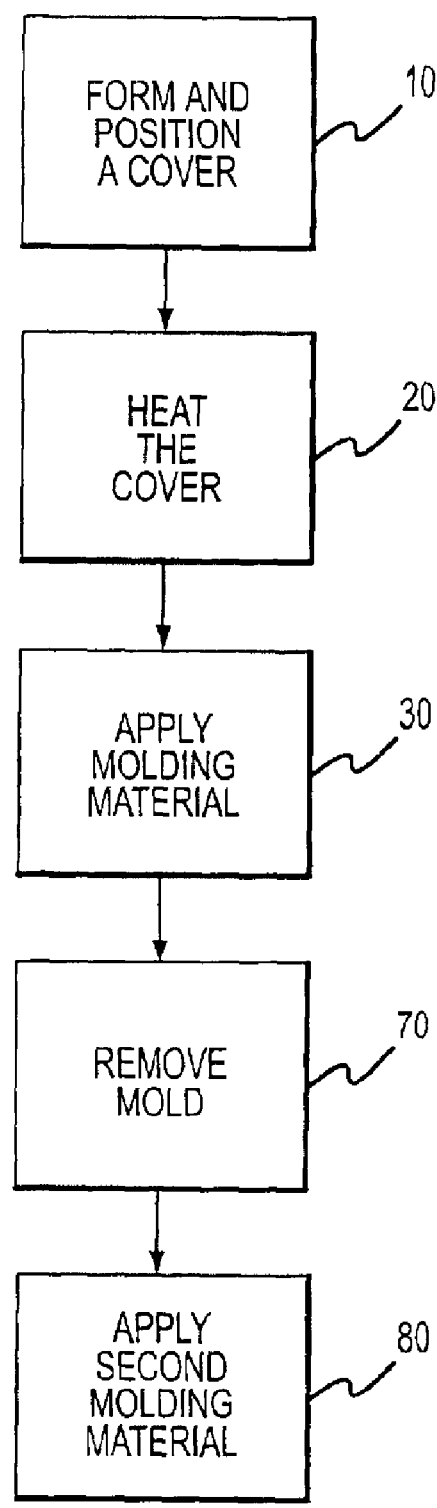
FIG. 3 illustrates a method for forming a hard cover for at least a portion of an article in accordance with a further exemplary embodiment of the present invention.

In an alternative embodiment of the invention, as illustrated in FIG. 3, a hard cover with a smooth outer surface may be formed using the hard cover formed according to the method described above with reference to FIG. 1. In this embodiment, the hard cover formed according to the method described above with reference to FIG. 1 serves as a mold for the smooth outer surface hard cover and, for convenience, will be referred to hereinafter as "the mold." Because the molding material of the mold is applied over the fitted cover of the shrink wrap material, the surface of the mold that contacts the fitted cover acquires the inverse of the features of the surface of the fitted cover. Because the fitted cover is formed by shrinking the shrink wrap material until taut, the fitted cover typically results in a smooth outer surface. Correspondingly, the surface of the mold that contacts the fitted cover is smooth. This smooth surface of the mold, which is the negative impression of the fitted cover, thus may be used to form a hard cover with a smooth outer surface.

As illustrated in FIG. 3, steps 10, 20 and 30 are performed as described above with reference to FIG. 1. Following steps 10, 20 and 30, after the mold is removed from the fitted cover (step 70), a second molding material may be applied to the smooth surface of the mold (step 80). In one exemplary embodiment of the invention, the second molding material is applied in a layer having a uniform thickness. In another exemplary embodiment of the invention, the second molding material is applied so that the resulting hard cover has a uniform thickness that is sufficient to protect the article or portion of the article from environmental elements and to withstand impacts from falling debris such as rocks, tree branches, and the like. The second molding material may comprise the same molding material used to manufacture the mold or, alternatively, may be comprise different molding material.

Figure 4:
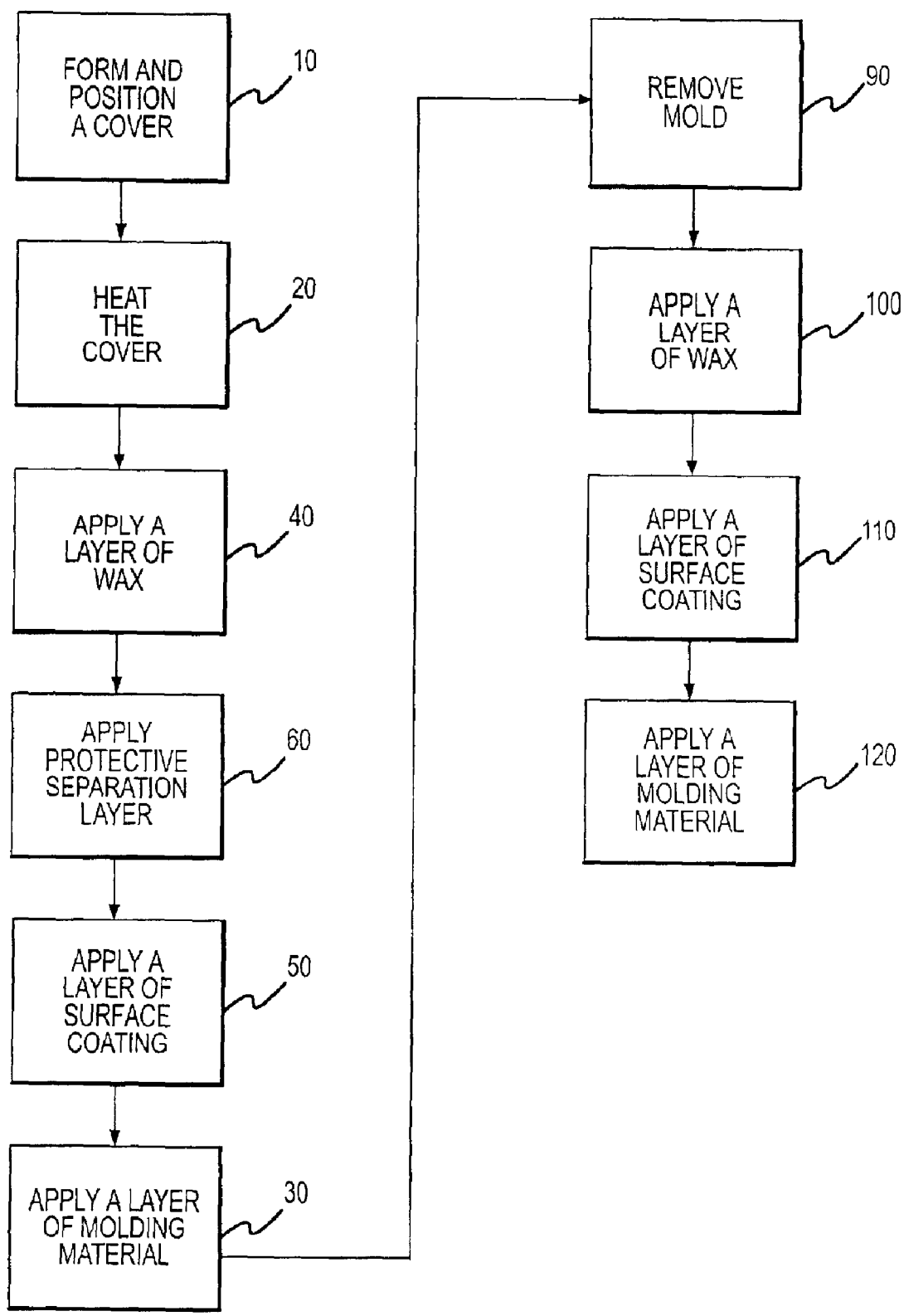
FIG. 4 illustrates a method for forming a hard cover for at least a portion of an article in accordance with another exemplary embodiment of the present invention.

FIG. 4 illustrates another embodiment of the present invention wherein a hard cover with a smooth outer surface may be formed using the hard cover formed according to the method described above with reference to FIG. 2. In this embodiment, the hard cover formed according to the method described above with reference to FIG. 2 serves as a mold for the smooth outer surface hard cover and, for convenience, will be referred to hereinafter as "the mold." As described above with reference to FIG. 3, typically the surface of the mold that contacts the fitted cover is smooth. This smooth surface of the mold, which is the negative impression of the fitted cover, thus may be used to form a hard cover with a smooth outer surface.

Referring to FIG. 4, the fitted cover is formed as described above with reference to steps 10 and 20 of FIG. 1. After the fitted cover is formed and has cooled to a desirable temperature, a layer of wax may be applied to the fitted cover as described above with reference to step 40 of FIG. 2. An optional protective layer may then be formed overlying the layer of wax as described above with reference to step 60 of FIG. 2. A layer of surface coating then may be applied overlying the fitted cover as described above with reference to step 50 in FIG. 2. In an exemplary embodiment, the surface coating may comprise a catalyzed sanding primer which can be sanded or otherwise further processed for a desired finish. An example of a catalyzed sanding primer for use as a surface coating includes Duretec™ by Dura Technologies, Inc. A layer of molding material is applied overlying the layer of surface coating as described above with reference to step 30 in FIG. 2. The molding material is then hardened or permitted to harden to form a mold. The mold is then removed from the fitted cover (step 90) and any remains or residue from the layer of wax and/or the protective layer are removed from the mold.

In one embodiment of the invention, a layer of wax may then be applied to the smooth surface of the mold (step 100). The layer of wax will permit the subsequently-formed smooth outer-surface hard cover to be easily removed from the mold without sticking. The wax may comprise any of the materials discussed above with reference to step 40 of FIG. 2 and, in an exemplary embodiment, comprises a mold release wax. The wax may be applied to the mold by manual application, such as by applying with a cloth, brush, or other applicator, or may be sprayed on the mold by an atomizer or other spray applicator.

In another embodiment of the invention, a layer of surface coating then may be applied overlying the layer of wax (step 110). The layer of surface coating will provide a smooth outer surface to the desired hard cover which will provide an aesthetically pleasing appearance to the hard cover. In addition, coloring may be added to the layer of surface coating so that the resulting hard cover is attractive and/or matches the color of the article for which it is fabricated to cover. The layer of surface coating may comprise any of those materials used to form the layer of surface coating described above with reference to step 50 of FIG. 2. In an exemplary embodiment, the surface coating may comprise a gel coating to which color may be applied or which may be painted after the hard cover is removed from the mold. An example of a gel coating suitable for use in the present invention may include Polycor® by Cook Composites and Polymers, Kansas City, Mo. The surface coating may be applied manually, such as with the use of a brush or other applicator or may be sprayed over the mold by an atomizer or may be applied by any other suitable method that achieves a surface coating layer having a relatively consistent thickness and surface texture.

After the surface coating is applied, it is permitted to set, preferably until it becomes tacky to the touch, at which time a layer of molding material may be applied to the surface coating (step 120). The layer of molding material may comprise any of the components that are used to form the layer of molding material as described above with reference to step 30. In an exemplary embodiment, the layer of molding material is applied so that the resulting hard cover has a thickness sufficient to protect the article or portion of the article from environmental elements and to withstand impacts from falling debris such as rocks, tree branches, hail and the like. Once the layer of molding material has hardened or has been hardened, the resulting smooth outer-surface hard cover may be removed from the mold for further finishing or for use.

The following example illustrates a method, in accordance with one exemplary embodiment of the invention, for fabricating a hard cover for an article. In an initial step of the process, a loose cover for the article is fabricated from heat shrink wrap material. In an exemplary embodiment, the cover is designed to cover at least the portion(s) of the article that is to be protected by the hard cover. The cover may be fabricated by patterning, cutting and sewing together pieces of the heat shrink wrap material so that a loose custom-fit cover which envelops features of the article is achieved. The cover may be sewn together using blind seams so that the outside surface of the cover is substantially smooth. The cover is secured to the article to prevent movement of the cover during heating. The cover is then subjected to heat, of a temperature in the range of from about, for example, 210–235° F., to shrink the shrink wrap material and form a taut, fitted cover overlying the article. In an optional embodiment of the invention, molding clay may be applied to the seams of the fitted cover to achieve a smooth surface near and at the seams.

Once the fitted cover is formed and sufficiently cooled, a first layer of mold release wax is applied by manually wiping the mold release wax onto the fitted cover to a thickness sufficient to permit the subsequently-formed mold to be removed from the fitted cover without sticking. A protective layer comprising PVA is then applied overlying the first layer of mold release wax by spraying the PVA onto the fitted cover by an atomizer. In an exemplary embodiment, the PVA is sprayed onto the fitted cover in stages so that a layer of PVA having a desired thickness is achieved.

After the PVA has dried, a layer of sanding primer is then applied overlying the PVA layer, by, for example, spraying the sanding primer over the fitted cover using a sprayer. The sanding primer is applied such that it has a thickness of approximately 18–22 mils. The sanding primer is permitted to set until it becomes tacky to the touch, typically about 30 minutes. A first layer of molding material comprising a fiberglass/resin mixture is then applied overlying the layer of sanding primer. Initially, a thin coating of the fiberglass/resin mixture is applied to the layer of sanding primer to form a skin coat. Once applied, the skin coat may be treated to compact the skin coat and to firmly adhere the skin coat to the sanding primer. The skin coat may also be treated to release any air pockets or bubbles that may have formed in the skin coat. Such treatment may include, for example, rolling the skin coat with a roller or other suitable device. In addition, any excess and undesired skin coat is removed with, for example, a sharp object, such as a knife, after the skin coat has become set but before the skin coat has dried. If the skin coat is trimmed before it has had an opportunity to set, it may rip. If the skin coat is trimmed after it has dried, it may be too hard to trim, even with a sharp object, thus requiring labor-intensive, and dirty, power cutting tools.

After the skin coat has dried to the touch, additional coatings of the fiberglass/resin mixture may be applied to the skin coat to form a hard mold. In an exemplary embodiment, the mold has at least 6 coatings of the fiberglass/resin mixture or is at least 0.5 inches thick. However, it will be appreciated that the mold may have any suitable number of layers or any suitable thickness that will ensure the strength of the mold and will prevent flexing or twisting of the mold when in use. Once the desired number of coatings of fiberglass/resin mixture are applied and are permitted to dry, the resulting mold is removed from the fitted cover and any wax or PVA residue may be removed from sanding primer coating of the mold. Optionally, the sanding primer coating may be further processed, such as by sanding or buffing, to provide an even smoother surface.

The surface of the mold that contacted the fitted cover forms a negative impression of the fitted cover and, because the fitted cover has a smooth surface, the surface of the mold that contacted the fitted cover has a smooth surface. This smooth surface can be used as a mold for a smooth-surfaced hard cover for the article. Accordingly, a layer of mold release wax is applied to this smooth surface of the mold. The layer of mold release wax may comprise the same material used for the first layer of mold release wax used to form the mold or may comprise any other suitable wax that will permit the removal of the subsequently-formed hard cover from the mold without sticking. Next, a protective layer of PVA is applied, as described above, over the layer of mold release wax and a layer of gel coating is applied to the mold overlying the layer of PVA. The layer of gel coating may be applied using any suitable method for applying gel coating. The gel coating may be applied to have any suitable thickness but is preferably applied to have a thickness of 18–22 mils. After the layer of gel coating is applied, it is permitted to set, preferably until it becomes tacky to the touch.

A layer of molding material comprising a fiberglass/resin mixture is then applied to the layer of gel coating. The fiberglass/resin mixture may be the same mixture used to make the mold or may comprise any other suitable fiberglass/resin mixture. As described above for the formation of the mold, initially a thin coating of the fiberglass/resin mixture is applied to the layer of gel coating to form a skin coat. The skin coat is treated with a roller to compact the skin coat, to firmly adhere the skin coat to the gel coating, and to release any air pockets or bubbles that may have formed in the skin coat. In addition, any excess and undesired skin coat is removed with, for example, a sharp object, such as a knife, after the skin coat has become set but before the skin coat has dried. After the skin coat has dried to the touch, additional coatings of the fiberglass/resin mixture may be applied to the skin coat to form the hard cover. In an exemplary embodiment, the hard cover has at least 6 coatings of the fiberglass/resin mixture or is at least 0.5 inches thick. However, it will be appreciated that the hard cover may have any suitable number of layers or any suitable thickness that will ensure the strength of the mold and will prevent flexing or twisting of the mold. Once the desired number of coatings of the fiberglass/resin mixture are applied and are permitted to dry, the resulting hard cover is removed from the mold for further finishing or for use.

In an optional step, once the layer of molding material hardens, an additional layer of surface coating may be applied to the layer of molding material using an application process as described above. This surface coating layer will provide a finished, smooth texture to the surface of the hard cover that is opposite the mold so that both surfaces of the hard cover are smooth. While this optional step may provide an aesthetic appeal to the hard cover, it will be appreciated that it is not necessary to the formation of the hard cover.

While the above-described example discloses a method for facilitating fabrication of a hard cover using heat shrink wrap material, mold release wax, PVA, sanding primer, fiberglass/resin mixture and gel coating, the present invention is not limited to such components and any suitable shrink wrap material, wax, protective layer, surface coatings and molding materials may be used.

It will be appreciated that the exemplary embodiments of the process of the present invention described above are not limited to the fabrication of covers for articles but can also be used to fabricate a first article from a second article. In this manner, the first article may be fabricated by first forming a mold of the second article as described above. After the mold is produced, molding material may be applied to the mold, as described above, to form the first article. In addition, the optional steps of applying a layer of wax, applying a protective layer, and applying a layer of surface coating may be performed. The first article may have any thickness suitable for a desired function, strength or other characteristic. Applications for the method of the present invention can be used to produce any number of various articles, such as, for example, bumpers, hoods and other parts for land-, water- and aircraft, medical prosthetics, custom-fit storage containers, such as for military weapons and explosives, and any other suitable articles.

Various modifications and alterations to the above-described preferred embodiments will be apparent to those skilled in the art. Accordingly, these descriptions of the invention should be considered exemplary and not as limiting the scope and spirit of the invention as set forth in the following claims.

I claim:

1. A method for facilitating the fabrication of a hard cover for at least a portion of an article, the method comprising:
   positioning shrinkable material over at least a portion of the article;
   shrinking said shrinkable material to form a fitted cover for said at least a portion of the article;
   applying a layer of molding material overlying said fitted cover to form a hard cover for said at least a portion of the article; and
   applying a protective layer comprising polyvinyl alcohol overlying a surface of said fitted cover before said applying said layer of molding material.

2. A method for facilitating the fabrication of a hard cover for at least a portion of an article, the method comprising:
   positioning shrinkable material over at least a portion of the article;
   shrinking said shrinkable material to form a fitted cover for said at least a portion of the article;
   applying a layer of molding material overlying said fitted cover to form a hard cover for said at least a portion of the article;
   applying a layer of surface coating overlying said fitted cover before said applying said layer of molding material; and applying a protective layer overlying a surface of said fitted cover before said applying said layer of surface coating.

3. A method for facilitating fabrication of a first article from a second article, the method comprising:

positioning shrinkable material over at least a portion of the second article; shrinking said shrinkable material to form a fitted cover for said at least a portion of said second article;

applying a first layer of molding material overlying said fitted cover to form a mold, said mold having a surface which is a negative impression of at least a portion of said fitted cover; removing said mold from said fitted cover;

applying a second layer of molding material overlying said surface of said mold to form the first article;

applying a protective layer comprising polyvinyl alcohol Overlying a surface of said fitted cover before said applying said first layer of molding material.

4. A method for facilitating fabrication of a first article from a second article, the method comprising:

positioning shrinkable material over at least a portion of the second article;

shrinking said shrinkable material to form a fitted cover for said at least a portion of said second article;

applying a first layer of molding material overlying said fitted cover to form a mold, said mold having a surface which is a negative impression of at least a portion of said fitted cover;

removing said mold from said fitted cover;

applying a second layer of molding material overlying said surface of said mold to form the first article;

applying a layer of surface coating overlying said fitted cover before said applying said first layer of molding material; and applying a protective layer overlying a surface of said fitted cover before said applying said layer of surface coating.

5. A method for facilitating fabrication of a first article from a second article, the method comprising:

positioning shrinkable material over at least a portion of the second article;

shrinking said shrinkable material to form a fitted cover for said at least a portion of said second article;

applying a first layer of molding material overlying said fitted cover to form a mold, said mold having a surface which is a negative impression of at least a portion of said fitted cover;

removing said mold from said fitted cover;

applying a second layer of molding material overlying said surface of said mold to form the first article; and applying protective layer comprising polyvinyl alcohol overlying said surface of said mold before said applying said second layer of molding material.

6. A method for facilitating fabrication of a first article from a second article, the method comprising:

positioning shrinkable material over at least a portion of the second article;

shrinking said shrinkable material to form a fitted cover for said at least a portion of said second article;

applying a first layer of molding material overlying said fitted cover to form a mold, said mold having a surface which is a negative impression of at least a portion of said fitted cover;

removing said mold from said fitted cover;

applying a second layer of molding material overlying said surface of said mold to form the first article;

applying a layer of surface coating overlying said surface of said mold before said applying said second layer of molding material; and applying a protective layer overlying a surface of said fitted cover before said applying said layer of surface coating.

7. A method for facilitating fabrication of a first article from a second article, the method comprising:

forming over at least a portion of the second article a cover comprising a heat shrinkable material;

heating said cover to shrink said heat shrinkable material to form a fitted cover for said at least a portion of said second article;

applying a first wax layer overlying a surface of said fitted cover;

applying a first protective layer overlying said first wax layer;

applying a first layer of surface coating overlying said first protective layer;

applying a first layer of molding material overlying said first layer of surface coating to form a mold, said mold having a surface which is a negative impression of at least a portion of said fitted cover;

removing said mold from said fitted cover;

applying a second wax layer overlying said surface of said mold;

applying a second protective layer overlying said second wax layer;

applying a second layer of surface coating overlying said second protective layer;

applying a second layer of molding material overlying said second layer of surface coating to form a first article; and removing said first article from said mold.

8. The method of claim 7, said first article comprising a hard cover for said second article.

* * * * *